Sept. 25, 1934.  T. E. KELLY  1,974,615
SAUSAGE LINKING MACHINE
Filed March 7, 1932  2 Sheets-Sheet 1

INVENTOR:
THOMAS E. KELLY.
BY HIS ATTORNEYS.
Williamson & Williamson

Sept. 25, 1934.  T. E. KELLY  1,974,615
SAUSAGE LINKING MACHINE
Filed March 7, 1932  2 Sheets—Sheet 2

INVENTOR.
THOMAS E. KELLY.
BY HIS ATTORNEYS.
Williamson & Williamson

Patented Sept. 25, 1934

1,974,615

UNITED STATES PATENT OFFICE 1,974,615

SAUSAGE-LINKING MACHINE

Thomas E. Kelly, Minneapolis, Minn.

Application March 7, 1932, Serial No. 597,103

9 Claims. (Cl. 17—34)

This invention relates to sausage linking machines.

It is the object of the invention to provide a novel and improved machine which can be successfully used for linking sausages without danger of breakage of the delicate sausage casings, and which machine is of cheap and simple construction and can be maintained in clean and sanitary condition with ease.

To these ends, generally stated, the invention consists in the novel parts and novel combinations of parts hereinafter defined in the claims and described in the following specification, made in connection with the accompanying drawings, wherein like reference characters refer to the same or similar parts throughout the various views and in which, Fig. 1 is a view in side elevation of a machine embodying the invention, certain of the parts being shown in one position in full lines, and in second position in dotted lines;

Figure 1:
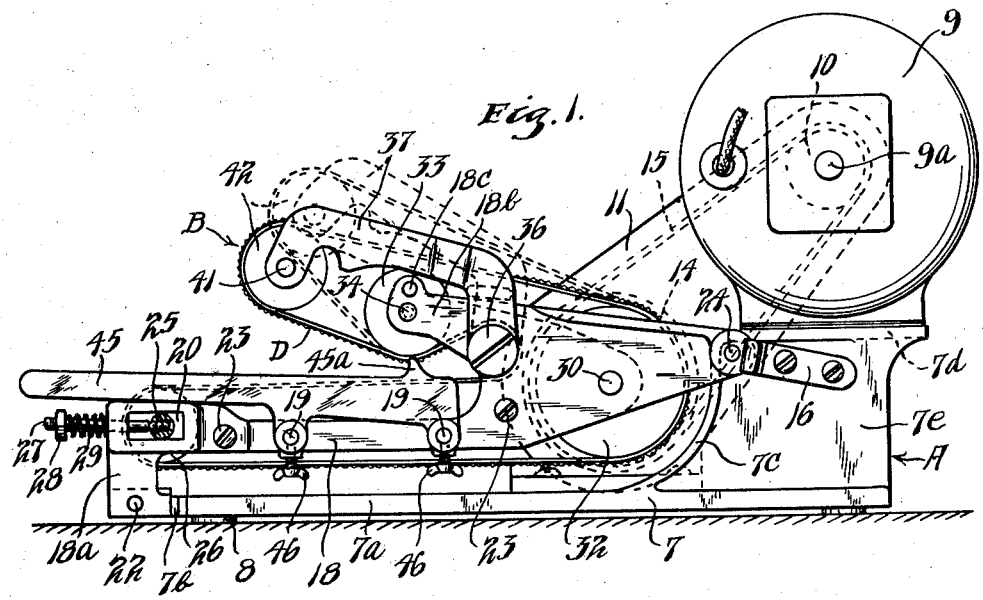
Figure 2:
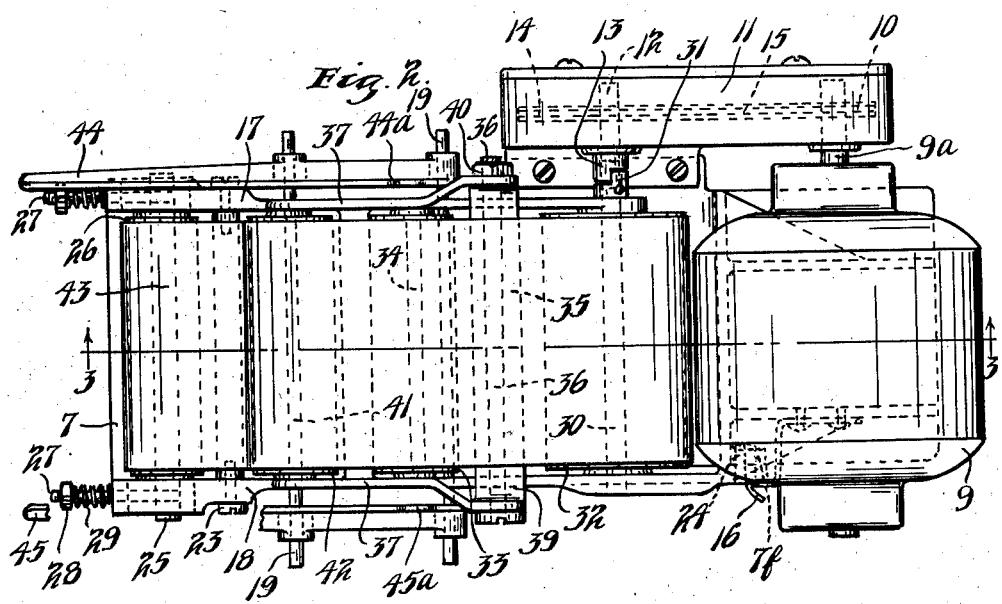
Fig. 2 is a plan view of the machine.

The machine, in general, comprises a fixed section A and a removable section B adapted to be engaged with the fixed section. Fixed section A includes a base casting 7 shaped to form a substantially horizontal base plate 7a having a strengthening rib 7b at its forward edge, an upwardly curved plate 7c branching outwardly from the base plate 7a, a horizontal platform 7d joining the upper edge of the curved plate 7c and side walls 7e running between the rear portion of base plate 7a and the side edges of platform 7d and joining the side edges of the curved plate 7c. Resilient cushioning pads 8 are secured to the lower surface of base plate 7a to support section A as on a flat supporting surface.

Figures 4, 6:
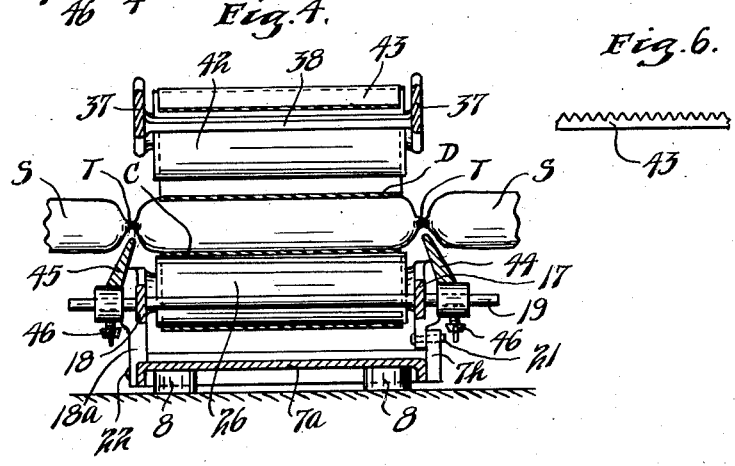
Fig. 4 is a vertical section taken substantially on the line 4—4 of Fig. 3, as indicated by the arrows; several linked sausages being shown in place as they will appear after the linking operation is completed and before the sausages are withdrawn from the machine.
Fig. 6 is a view on an enlarged scale showing a portion of the belt of the machine, the view being taken in side elevation.
Figure 5:
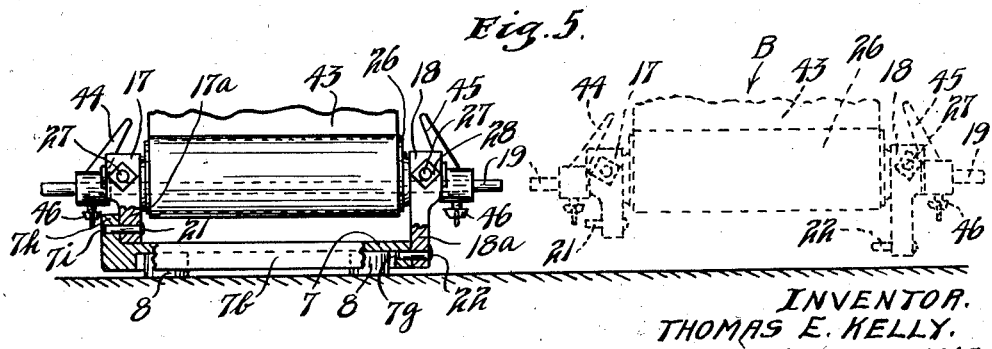
Fig. 5 is a view taken chiefly in front end elevation of the machine, certain of the parts being shown in section and certain of the parts being shown in full lines in one position and in dotted lines in a second position.

Mounted on platform 7d is an electric motor 9 having a motor shaft 9a projecting from the left side of casting 7 when the machine is viewed as shown in Figs. 4 and 5. The projecting end of motor shaft 9a carries a sprocket 10 which is disposed within the upper end of a housing 11 secured to a projection on the left side of the base plate 7a. Journaled within housing 11 adjacent the lower portion thereof is a stub shaft 12 which carries a half clutch member 13 projecting inwardly from the right side of housing 11. This half clutch member 13 projects inwardly beyond the end of stub shaft 12 and it is apertured in line with the shaft 12 through its inner portion. Stub shaft 12 carries a sprocket 14 within housing 11 and an endless chain 15, preferably of the silent type, is disposed within housing 11 and runs over the two sprockets 10 and 14. A pin receiving opening 7f is provided in the right side 7e of casting 7 adjacent the point where the platform 7d joins the curved plate 7c, while a similar pin receiving opening 7g is provided in the right side of rib 7b, adjacent the forward edge of the casting. An upturned lug 7h is formed at the left side of the casting 7 adjacent the forward edge thereof and a pin receiving opening 7i is provided in this lug 7h. A spring 16 is secured to the right side 7e of casting 7 and this spring has an outwardly curved free end which substantially overlies pin opening 7f, in outwardly disposed relation therefrom.

The removable section B includes a pair of side frames 17 and 18 respectively secured together in spaced parallel relation as by means of spacing rods 23 and guide rods 19 mounted in the side frames. The guide rods 19 project outwardly beyond the outer sides of the respective side frames 17 and 18 for a purpose presently to appear, and these guide rods are disposed in spaced, horizontal, parallel relation. The side frames 17 and 18 have thickened forward ends within which longitudinal slots 20 are formed. Projecting downwardly from the forward end of side frame 17 is a short leg 17a carrying an outwardly projecting pin 21 adapted to be received within the pin opening 7i when the removable section B is assembled in place on the fixed section A. The forward thickened end of side frame 18 has a longer downwardly extending leg 18a carrying an inwardly projecting pin 22 adapted to be received within pin openings 7g when the two sections A and B are assembled together. Side frame 18 projects rearwardly beyond side frame 17 and at its rear end side frame 18 carries an inwardly projecting pin 24 adapted to be received within the pin opening 7f when the two sections A and B are assembled together.

The two side frames 17 and 18 have upwardly and forwardly projecting arms 17b and 18b respectively and these arms are oppositely disposed and run forwardly above the lower portions of the side frames from adjacent the rear ends of the side frames. A roller shaft 25 upon which a forward roller 26 is journaled, extends through the slots 20 at the forward ends of the two side frames 17 and 18 and secured to this shaft 25 are a pair of forwardly projecting studs 27 which project forwardly from the slots 20 through the forward ends of the respective side frames 17 and 18 and carry nuts 28 on screw threaded forward portions thereof. Small coiled springs 29 surround the studs 27 forwardly of the side frames and have bearing against the forward ends of the side frames and the nuts 28. A cross shaft 30 is journaled in the side frame 17 adjacent its rear end and is also journaled in side frame 18 in silghtly forwardly spaced relation from its rear end. This shaft projects beyond the left side of side frame 17 and carries adjacent its ends a half clutch member 31. The extreme left end of shaft 30 is adapted to be received within the opening in half clutch member 13 and half clutch member 31 is adapted to engage with half clutch member 13 when the two sections A and B are in assembled relation. Keyed or otherwise secured to shaft 30 intermediate the two side frames is a large rear roller 32 of approximately twice the diameter of forward roller 26. The axis about which roller 32 may rotate is disposed at approximately the same level as the upper surface of roller 26. An upper roller 33 is journaled on a cross shaft 34 extending between and mounted in the forward ends of arms 17b and 18b of the side frames. This upper roller 33 is preferably of slightly greater diameter than roller 26 and the axis of rotation for the roller 33 is spaced considerably above the axis of rotation for the roller 32. An intermediate roller 35 of quite small diameter is journaled between the side frames on a cross shaft 36 extending between and mounted in the arms 17b and 18b of the side frames approximately midway between the two roller shafts 30 and 34. The axis of rotation of roller 35 is slightly above the axis of rotation of the roller 32, and the lower surface of the roller 35 is approximately level with the upper surface of forward roller 26. A pair of upwardly and forwardly extending arms 37 interconnected by cross bar 38 and a cross bar 39 are pivotally mounted at their lower rear ends on roller shaft 36 outwardly from the side frames 17 and 18 and as this roller shaft 36 is provided with a head at its right end and a screw threaded nut 40 at its left end, the arms 37 can be adjusted and locked in a desired tilted position relative to the side frames by merely tightening the nut 40. The forward ends of arms 37 carry a roller shaft 41 upon which a top roller 42 is journaled and, of course, this top roller can be adjusted to different levels by swinging movement of the arms 37.

Figure 3:
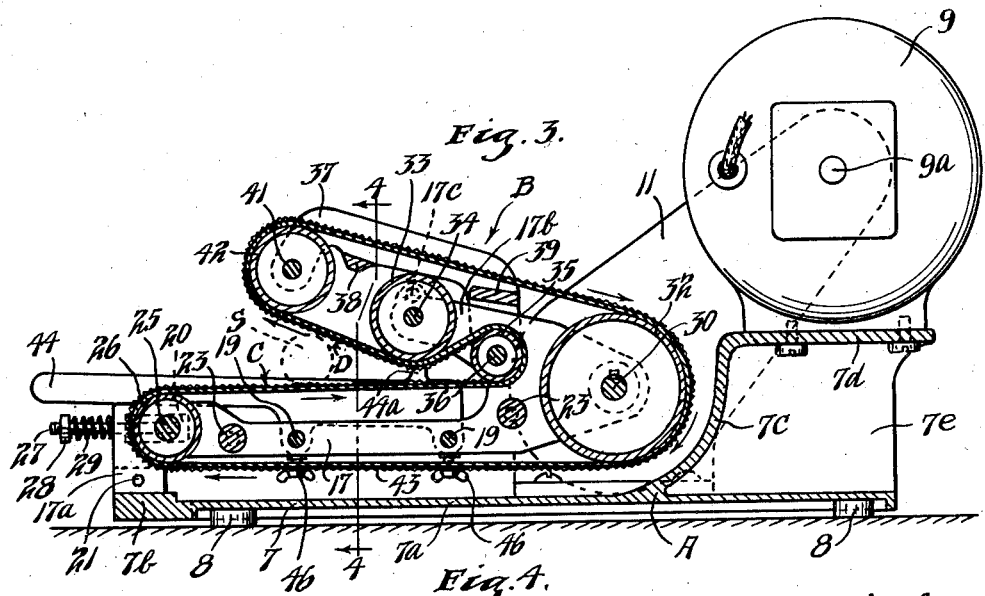
Fig. 3 is a vertical section taken through the machine substantially on the line 3—3 of Fig. 2, the motor not being sectioned.

An endless flexible belt 43 preferably corrugated on its outer surface and composed from some suitable material such as corded rubber, is trained over the various rollers 26, 32, 42, 33 and 35, to assume the position best illustrated in Fig. 3. This belt has a substantially horizontal run C projecting from forward roller 26 to intermediate roller 35 and it has an upwardly and forwardly inclined run D extending from upper roller 33 to top roller 42. This belt will be driven in the direction as indicated by the arrows Fig. 3, and the horizontal run C which faces the inclined run D will move rearwardly as shown, while the inclined run D will move forwardly and upwardly in a direction generally opposite to the run C.

A pair of oppositely disposed runways 44 and 45 respectively, have horizontally spaced hubs through which the projecting portions of the guide rods 19 at the left side of the machine and the outwardly projecting portions of the guide rods at the right side of the machine extend to permit lateral adjustment of the runways 44 and 45 respectively. The runways are adapted to be clamped in adjusted position to the guide rods 19 as by means of set screws 46. The runways 44 and 45 are inclined preferably inwardly toward their upper edges from their lower edges as best shown in Figs. 4 and 5 and the upper edges of the runways are quite narrow and lie in a plane inclined slightly to the horizontal downwardly from the forward ends of the runways to the rear ends thereof. Below the roller shaft 34, upwardly projecting stop lugs 44a and 45a are formed on the upper edges of the runways.

To assemble the movable section B in place on the fixed section A, the movable section will be shifted laterally to the left from a position to the right of section A as indicated in dotted lines Fig. 5 to the position shown in full lines Fig. 5. Short leg 17a will be carried against lug 7h and pin 21 will be received within pin opening 7i. Longer leg 18a will be carried against the right side of rib 7b and pin 22 will be received within pin opening 7g. The rear end of side frame 18 will be carried against the right side 7e and pin 24 will be received within pin opening 7f. Spring 16 will yield to allow the movement of the rear end of side frame 18 to this position whereupon the spring will snap to the position shown in Fig. 1, thereby retaining the rear end of side frame 18 against the right side 7e. The left end of shaft 30 will be received within the opening of half clutch member 13 and half clutch member 31 will be engaged with half clutch member 13 to cause rotation of shaft 30 and roller 32 mounted thereon as shaft 12 is rotated.

Before using the machine for linking sausages, the two runways 44 and 45 will be spaced from each other by adjustment on guide rods 19 to gauge the length of the individual sausages to be formed. Also arms 37 will be swung upwardly or downwardly and locked in proper position by tightening nut 40 to space the run D of belt 43 a desired distance from the run C of the belt to properly receive the cased sausages between these two runs of the belt. In beginning the linking operation, a sausage casing filled with sausage meat will be placed on the upper edges of the runways 44 and 45, so that the unlinked filled casing projects transversely across the runways, with one end of the filled casing adjacent one of the runways, as the left runway 44. The casing will then be pinched from its upper side downwardly against the upper edges of the runways 44 and 45. Prior to this time, the motor 9 will, of course, be set in operation, thereby causing the belt 43 to move in the direction as indicated by the arrows Fig. 3. After the filled sausage casing has been pinched as described, the filled casing will be slid rearwardly from the forward ends of the runways 44 and 45 to the position illustrated by the dotted lines in Fig. 3, the filled casing being designated by the letter S. The upper edges of the runways 44 and 45 extend at their forward ends slightly above the level of the horizontal run C of belt 43, while adjacent their rear ends the upper edges of the runways lie approximately level with the horizontal run C of the belt. The filled casing S upon being carried to the position shown in Fig. 3, and also shown in full lines Fig. 4, will at its upper portion contact the inclined run D of belt 43 and will at its lower portion contact the horizontal run C of the belt. As the two runs C and D of the belt are moving in opposite directions, the portion of the filled sausage casing between the two runways 44 and 45, will be given a quick rotation by the runs C and D of the belt to form twists T in the sausage casing to produce a sausage link. After the twists T have been made, the sausage link will be slid forwardly on the runways, whereupon the filled sausage casing S will be moved laterally to the left of the machine a distance approximating the length of two links. The filled casing will then be again laid on the runways 44 and 45 and the operation will be repeated. In practice, the linking operation will be very quickly accomplished. The portion of the filled casing between the two runways 44 and 45 will be rapidly slid rearwardly on the runways to contact the runs C and D of the belt for just an instant, whereupon the completed link will be drawn forwardly on the runways. It will be seen that only alternate longitudinal portions of the filled casing S will be operated upon by the machine due to the fact that two twists T are simultaneously made during a single operation of the machine.

The twists T that are made in the filled sausage casing S by use of the machine, are very short and the sausages that are formed will be quite blunt ended. As a result, sausage casings may be more completely filled with sausage meat than is the usual case when other types of linking machines are used and there will be a considerable saving in the quantity of casings used. These casings are very expensive and the saving of the quantity of casings used by a sausage maker aids materially in reducing the expense of manufacture of linked sausages.

Much difficulty has been heretofore experienced in producing linked sausages, due to the fact that the sausage casings used are exceedingly delicate and tender and often break during the linking operation. With the present machine, utilizing only a single belt for the linking operation, it will be at once apparent that both runs C and D of the belt operating upon a filled sausage casing travel at the same speed and there is thus very slight danger of ripping or tearing the casing of the sausage during the linking operation. In linking machines utilizing two or more belts which operate upon the filled casing simultaneously, it is exceedingly difficult to cause the two runs of the two belts operating upon the filled casing to travel at exactly the same speed and as a result, there is danger of tearing or ripping the casing of the sausages. Attention is also called to the fact that in many of the machines of the prior art, several links of a sausage are simultaneously made. The casings within which the sausage meat is packed are often of different diameters at different longitudinal points and there is thus a tendency for the casings to tear when several links are simultaneously formed. In the present machine, although two twists are made in the casing simultaneously, to form one complete link, and half of an adjacent link at one end of the first link and half of an adjacent link at the other end of the first link, only one link of a sausage is being rolled by the belt at one time. If the portion of the filled casing adjacent one end of the link that is being formed is of greater diameter than the portion of the casing adjacent the other end of the link that is being formed, the belt 43 may yield slightly adjacent one edge of the same due to the resilient mounting of the forward roller 26 and as a result, there will be no tendency for the sausage casing to break due to the discrepancy in diameter of the casing between the two ends of the link. Attention should also be called to the fact that the resilient mounting of forward roller 26 causes this roller to act as a belt tightener.

Due to the inclination of run D of the belt relative to run C, it will be seen that sausages having different diameters can be rolled by the same machine. Also by swinging the arms 37 to various positions, the angle of the run D relative to run C may be changed to permit either very large sausages, such as wieners and frankfurters to be linked, or to permit sausages of very small diameter to be linked. The lugs 45a act to prevent insertion of the filled sausage casing S beyond certain points. As section B can be readily removed from section A, it will be seen that all parts of the machine can be readily cleaned. To remove the belt 43 for cleaning the same, it is only necessary to remove one of the arms 37 by unloosening the nut 40, whereupon roller shaft 36 may be withdrawn from the sides frames 17 and 18 to permit release of roller 35. The belt can then be readily removed from section B.

For linking extremely large sausages such as frankfurters, it is sometimes desirable to space the closest portions of the two runs C and D of the belt 43 further apart. For this purpose, shaft openings 17c and 18c are provided in the arms 17 and 18 respectively above the normal shaft openings in these arms for the shaft 34, and it is possible to mount the shaft 34 in the openings 17c and 18c to raise the roller 33 above its normal position and thereby space the lowest portion of the run D further from the run C.

The machine is simple in construction and in operation. It has been successfully demonstrated in actual practice.

It will, of course, be understood that various changes may be made in the form, details, arrangement and proportions of the various parts without departing from the scope of the present invention.

What is claimed is:—

1. A sausage linking machine comprising an endless moving belt mounted to form a substantially V-shaped sausage receiving mouth, the section of the belt forming one side of said mouth moving in one direction and the section of the belt forming the other side of said mouth moving in a generally opposite direction and runways adjacent the edges of one of said sections for supporting filled sausage casings while permitting the same to be slid into and out of said mouth in directions longitudinally of said belt sections.

2. A sausage linking machine comprising an endless moving belt mounted to form a substantially V-shaped sausage receiving mouth, the section of the belt forming one side of said mouth moving in one direction, and the section of the belt forming the other side of said mouth moving in a generally opposite direction, spaced parallel runways mounted adjacent the edges of one of said sections and means for varying the spacing between said runways.

3. A sausage linking machine comprising a pair of cross connected side frame structures, a plurality of rollers mounted for rotation in said side frame structures and extending between the same, one of said rollers being disposed at the forward ends of said side frames, a second of said rollers being disposed at the rear ends of said side frames, a third of said rollers being disposed forward of and above said first two mentioned rollers and a fourth roller being disposed forwardly of said second roller above said first roller and below and rearwardly from said third roller, an endless flexible belt running over said rollers and forming a bight about said fourth roller to present a substantially V-shaped sausage receiving mouth and parallel sausage supporting runways extending rearwardly towards said fourth roller from said first roller adjacent the sides of that portion of the belt forming the lower part of said mouth.

4. The structure defined in claim 3, said runways including mountings movable laterally from the sides of said belt and means for securing the same in desired spaced relation from the sides of said belt to gauge the length of sausage links.

5. A sausage linking machine comprising a pair of side frames cross connected and spaced from each other, a front roller mounted at the forward ends of said side frames, a rear roller mounted at the rear ends of said side frames, an upper roller mounted above said front and rear rollers and forwardly from said rear roller, an intermediate roller disposed above said front roller, forwardly of said rear roller, and rearwardly from said upper roller, arms mounted for swinging movement on said side frames, means for releasably fixing said arms to said side frames so that the forward ends of said arms project above said upper roller and forwardly therefrom, a top roller mounted in the forward ends of said arms, all of said rollers extending transversely of said side frames and being mounted for rotation, means for driving one of said rollers, an endless flexible belt trained over all of said rollers and having a bight portion extending over said intermediate roller to form a substantially V-shaped sausage receiving mouth and runways extending rearwardly towards said intermediate roller from said forward roller adjacent the sides of the lower portion of said mouth and upon which filled sausage casings are adapted to be supported for movement into said mouth.

6. The structure defined in claim 5, said front roller being yieldingly mounted to permit slight turning movement of the same relative to a plane extending truly transversely between said side frames and also to act as a belt tightener.

7. A sausage linking machine comprising a base section and a removable section normally attached thereto, driving mechanism mounted in said base section, a plurality of rollers rotatably mounted in said removable section, an endless flexible belt running over said rollers, said rollers being arranged to so direct said belt as to form a substantially V-shaped sausage receiving mouth, the section of said belt forming one side of said mouth moving in one direction and the section of the belt forming the other side of said mouth moving in the opposite direction, means for holding said removable section assembled on said base section and permitting ready removal of said removable section from said base section and a two part clutch between said driving mechanism and one of said rollers adapted to be engaged when said removable section is held assembled on said base section.

8. A sausage linking machine comprising a base having a lower substantially horizontal portion and an upwardly curved portion adjacent its rear end, a stub shaft mounted for rotation at one side of said base, means carried by said base for driving said stub shaft, a half clutch member mounted on said stub shaft and projecting toward the opposite side of said base from the side in which stub shaft is mounted, a frame structure adapted to be placed on said base to lie above said horizontal portion and chiefly forward of said upwardly curved portion cooperating releasable interlocking means on said base and frame structure to permit ready removal of said frame structure from said base, a plurality of rollers mounted for rotation in said frame structure, an endless flexible belt trained over said rollers, said rollers being arranged to cause said belt to form a substantially V-shaped sausage receiving mouth, one of said rollers including a roller shaft projecting from one side of said frame structure, a half clutch member mounted on said roller shaft and engaging with said first mentioned half clutch member when said frame structure is interlocked in position on said base.

9. A sausage linking machine comprising an endless moving belt mounted to form a substantially V-shape sausage receiving mouth, the section of the belt forming one side of said mouth moving in one direction and the section of the belt forming the other side of the mouth moving in a generally opposite direction and means adjacent the edges of one of said belt sections for slidably supporting a filled sausage casing while permitting the same to be moved into and out of said mouth in a direction longitudinally of said belt sections.

THOMAS E. KELLY.